United States Patent
Sipila

(10) Patent No.: US 8,369,810 B2
(45) Date of Patent: Feb. 5, 2013

(54) INTERFERENCE VARIANCE ESTIMATION FOR SIGNAL DETECTION

(75) Inventor: Teemu Sipila, Oulunsalo (FI)

(73) Assignee: Nokia Corporation, Espoo (FI)

( * ) Notice: Subject to any disclaimer, the term of this patent is extended or adjusted under 35 U.S.C. 154(b) by 602 days.

(21) Appl. No.: 11/878,719

(22) Filed: Jul. 26, 2007

(65) Prior Publication Data

US 2008/0200138 A1    Aug. 21, 2008

(30) Foreign Application Priority Data

Feb. 15, 2007    (EP) .................................... 07003245

(51) Int. Cl.
*H04B 17/00*    (2006.01)

(52) U.S. Cl. ................... 455/226.2; 455/226.1; 455/209

(58) Field of Classification Search .... 455/226.1–226.3, 455/230, 231, 254, 307, 296
See application file for complete search history.

(56) References Cited

U.S. PATENT DOCUMENTS

| | | | | |
|---|---|---|---|---|
| 5,835,532 A * | 11/1998 | Strolle et al. | ................. | 375/233 |
| 6,445,757 B1 * | 9/2002 | Raitola et al. | ................. | 375/347 |
| 6,816,557 B2 * | 11/2004 | Kuchi et al. | ................. | 375/299 |
| 7,379,724 B2 * | 5/2008 | Nilsson et al. | ................ | 455/296 |
| 7,406,070 B2 * | 7/2008 | Nilsson | ......................... | 370/342 |
| 7,688,796 B2 * | 3/2010 | Pan et al. | ...................... | 370/342 |
| 2004/0033791 A1 * | 2/2004 | Schmidl et al. | ............... | 455/137 |
| 2004/0196891 A1 | 10/2004 | Tapaninen | | |
| 2004/0264604 A1 | 12/2004 | Malette et al. | | |
| 2006/0159204 A1 * | 7/2006 | Karthik et al. | ............... | 375/340 |

OTHER PUBLICATIONS

Communication Pursuant to Article 94(3) EPC dated Aug. 21, 2012 corresponding to European Patent Application No. 08715794.7.
Notification of the First Office Action corresponding to Chinese Patent Application No. 200880005305.4 dated Jun. 5, 2012 and English translation thereof.

* cited by examiner

*Primary Examiner* — Christian Hannon
(74) *Attorney, Agent, or Firm* — Squire Sanders (US) LLP

(57) ABSTRACT

The present invention relates to a method, apparatus, and computer program product, wherein a level of a first signal received via first channel is determined. Additionally, a moving average of a plurality of determined levels of the first signal is obtained, and the moving average is subtracted from the determined level. The subtraction result is then used for estimating a noise variance of a second signal received via a second channel.

16 Claims, 4 Drawing Sheets ic # INTERFERENCE VARIANCE ESTIMATION FOR SIGNAL DETECTION

FIELD OF THE INVENTION

The present invention relates to a method, apparatus, and computer program product for detecting a signal in a wireless transmission system.

BACKGROUND OF THE INVENTION

In general, there are many known ways of estimating the presence of a signal at a receiver. For decision-making in connection with messages which are modulated to discrete values, such as "−1", "0", or "+1", the signal power is usually known (e.g. relative to a pilot signal), so that signal values, e.g., "−1" and "+1", can be detected with the same reliability, i.e., zero level can be used as a dividing or threshold line. Thus, if the received statistic is below zero, decide signal value "−1", and if it is above zero, decide signal value "+1".

However, in some transmission systems or standards, signal power may be totally unknown at the receiver side. As an example, in HSUPA (High Speed Uplink Packet Access) which is a new feature in 3GPP ($3^{rd}$ Generation Partnership Project) Release 6 specification, two HSUPA downlink physical channels, Enhanced Dedicated Channel (E-DCH) Hybrid ARQ (Automatic Repeat Request) Indicator Channel (E-HICH) and E-DCH Relative Grant Channel (E-RGCH) are provided, in which message are modulated to signal values "−1", "0", or "+1". The value "−1" means "negative amplitude", the value "0" means "no power at all", and the value "1" means "positive amplitude". If the value "−1" or "+1" is transmitted, the receiver at a terminal device (e.g. a user equipment (UE) in 3G terminology) must be capable of separating these values without knowing what power the transmitting base station has used or if it has used any power at all.

SUMMARY

It is therefore an object of the present invention to provide a method and apparatus, by means of which signal values can be estimated or detected without knowledge of the transmission signal or power level.

This object is achieved by a method comprising:
determining a level of a first signal received via a first channel;
obtaining a moving average of a plurality of determined levels of said first signal;
subtracting said moving average from said determined level, and
using the subtraction result for estimating a noise variance of a second signal received via a second channel.

Additionally, the above object is achieved by an apparatus comprising:
level determination means for determining a level of a first signal received via first channel;
averaging means for obtaining a moving average of a plurality of determined levels of said first signal;
subtraction means for subtracting said moving average from said determined level, and
estimation means for using the subtraction result to estimate a noise variance of a second signal received via a second channel.

Moreover, the above object is achieved by a computer program product comprising code means for producing the steps of the above-defined method when run on a computer device.

Accordingly, a moving average of signal of a second channel with known level(s) is used for deriving a noise variance estimate for a first channel with unknown level(s). Based on this estimated noise variance, signal values can be detected for the first channel. A robust and unbiased interference and/or variance estimation of good quality can thus be obtained, so that erroneous or missing detections of messages, such as "false ACK"-rate and "missed HOLD", can be kept substantially constant in changing propagation conditions, in changing interference conditions, at changing numbers of receiving paths, and irrespective of the use of power control at the transmitting side.

In an embodiment, the subtraction may be performed for each path of a plurality of receiving paths, wherein the noise variance may be estimated by combining subtraction results of the plurality of receiving paths. According to a specific non-limiting example, the plurality of receiving paths may be RAKE fingers.

Furthermore, examples for combining operations or procedures are RAKE combining, maximal-ratio combining, or interference rejection combining.

The obtained moving average may be used as a channel estimate.

In a further embodiment, the first channel may be a pilot channel, and the second channel may be a downlink physical channel of a wireless transmission system. In a more specific but non-limiting example, the second channel may be a hybrid automatic repeat request indicator channel or a relative grant channel of a high speed uplink packet access.

According to an optional modification, a threshold for detection of a value of a signal received via the second channel may be determined based on a standard deviation which is derived from the noise variance.

In another embodiment, the averaging stage may comprise an averaging filter. As an additional option, a delay stage may be provided for delaying the determined level and supplying it to the subtraction stage.

In a further embodiment, the averaging stage may comprise a plurality of averaging circuits for each of a plurality of receiving paths, and the subtraction stage may comprise a plurality of subtraction circuits for each of the plurality of receiving paths, wherein the estimator is configured to estimate the noise variance by combining subtraction results of the plurality of receiving paths.

Further advantageous modifications are defined in the dependent claims.

BRIEF DESCRIPTION OF THE DRAWINGS

In the following, the present invention will be described in greater detail based on embodiments with reference to the accompanying drawings, in which.

DESCRIPTION OF THE PREFERRED EMBODIMENT

Figure 1:
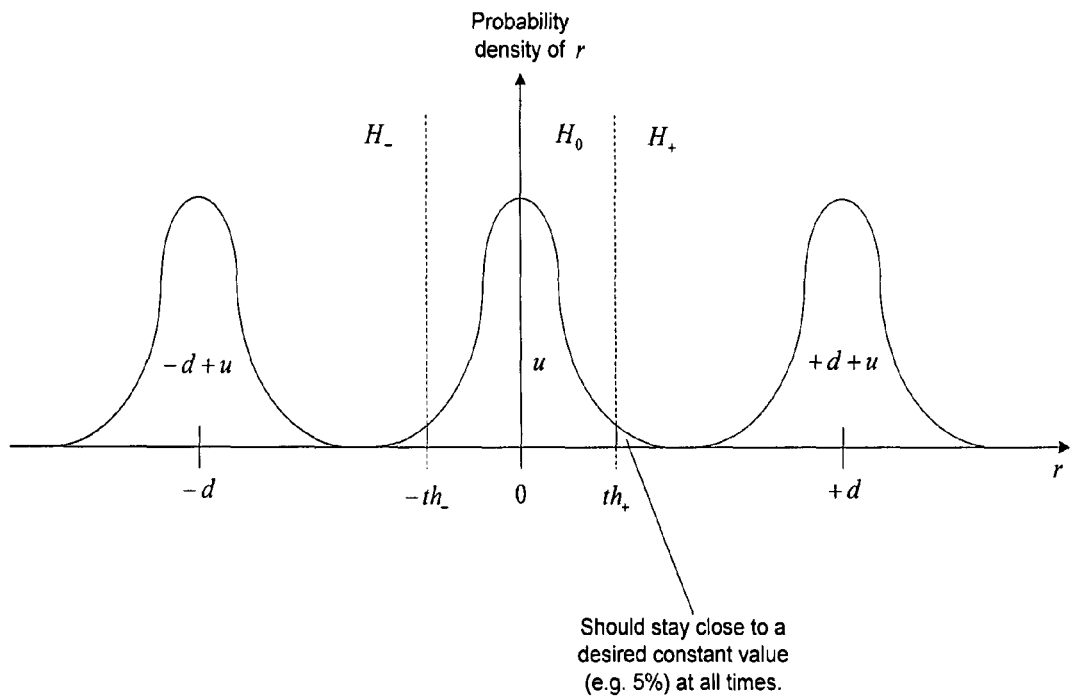
FIG. 1 shows possible probability density distributions of a received signal.

An embodiment will now be described based on signal detection in a cellular transmission system, more specifically a detection of a HSUPA downlink signalling. However, it is noted that the present invention is by no means limited to this specific signalling and network environment. In can be implemented or used in any transmission system where signal values are detected. More specifically, the present invention can be applied in radio systems like e.g. WiMAX (Worldwide Interoperability for Microwave Access) as currently standardized in 3GPP for WCDMA (Wideband Code Division Multiple Access), as well as 3GPP E-UTRAN (Enhanced Universal Mobile Telecommunications System (UMTS) Terrestrial Radio Access Network), such as LTE (Long Term Evolution) or 3.9G. These radio access technologies (e.g. WLAN, WiMAX, E-UTRAN or 3G LTE) may involve multiple-input multiple-output (MIMO) systems or multi-beam/multi-antenna transmitter or receiver devices (e.g. base station devices, access points or other access devices) capable of receiving signals via different receiving paths and/or channels.

HSUPA is a Release 6 feature in 3GPP specifications and is part of the HSPA (High Speed Packet Access) family. HSUPA is sometimes also called "Enhanced Uplink Dedicated Channel" (E-DCH). HSUPA aims to increase the uplink data transfer speed in the Universal Mobile Telecommunications System (UMTS) environment and offers data speeds of up to 5.8 Mbps in the uplink direction. HSUPA achieves its high performance through more efficient uplink scheduling in the base station and faster retransmission control.

The downlink dedicated physical channels comprise the E-RGCH which is a fixed rate (spreading factor SF=128) dedicated downlink physical channel carrying the uplink E-DCH relative grants. A relative grant is transmitted using 3, 12 or 15 consecutive slots and in each slot a sequence of 40 ternary values is transmitted. The 3 and 12 slot duration shall be used on an E-RGCH transmitted to UEs for which the cell transmitting the E-RGCH is in the E-DCH serving radio link set and for which an E-DCH transmission time interval (TTI) is respectively 2 and 10 ms. The 15 slot duration shall be used on an E-RGCH transmitted to UEs for which the cell transmitting the E-RGCH is not in the E-DCH serving radio link set.

Additionally, the downlink dedicated physical channels comprise the E-HICH which is a fixed rate (SF=128) dedicated downlink physical channel carrying the uplink E-DCH hybrid ARQ acknowledgement indicator. A hybrid ARQ acknowledgement indicator is transmitted using 3 or 12 consecutive slots and in each slot a sequence of 40 binary values is transmitted. The 3 and 12 slot duration shall be used for UEs which E-DCH TTI is set to respectively 2 ms and 10 ms.

For each TTI of each cell, the E-HICH is carrying a positive signal (power unknown), nothing (=discontinuous transmission (DTX)), or a negative signal (power unknown). The same applies to the E-RGCH. It follows that the detection problem related to E-HICH and E-RGCH involves the detection of zero desired power.

In general, at a given TTI, the received signal r always contains the desired signal d plus some unwanted signal u. Detection of zero desired power means that the detection process should be able to detect when the received signal contains only the unwanted signal u. The unwanted signal consists of noise and all types of interference.

Hence, for each E-DCH TTI, for both E-HICH and E-RGCH, and for one radio link, the task is to decide between three hypotheses:

$$H_-: r=-d+u$$

$$H_0: r=u$$

$$H_+: r=+d+u \quad (1)$$

wherein $H_-$ designates a negative signal hypothesis, $H_0$ designates a zero signal hypothesis, and $H_+$ designates a positive signal hypothesis. There are thus two unknowns (d and u) in equation (1), but only one known (r). The desired signal has a discrete distribution, i.e. it can have one of three possible values, namely "−d", "0", or "+d". The desired signal d can't be assumed to have a constant power, since it can be power controlled or not, it is up to the network to decide. Neither is the power of d related to any other received downlink channel, for example to the common pilot channel (CPICH) power. In short, d is totally unknown.

The desired behavior of the detection procedure is such that when DTX is transmitted (i.e. $H_0$ is true), no matter what the conditions and environment are, the probability of interpreting the unwanted signal as non-zero (i.e. decide something else than $H_0$) should always be close to the desired and tuned value (e.g. 50%, 1%, 0.02%, etc.).

The logic of the detection procedure should thus have the following overall structure:

$$\text{if } r > th_+ \Rightarrow \text{decide } H_+$$

$$\text{else if } r < -th_- \Rightarrow \text{decide } H_-$$

$$\text{else} \Rightarrow \text{decide } H_0 \quad (2)$$

where $th_+$ and $th_-$ designate thresholds, which can be computed by multiplying a constant $k_+$ or $k_-$ with the estimated standard deviation of the unwanted signal $\sqrt{Var[u]}$, for example $th_+ = k_+ \sqrt{Var[u]}$.

FIG. 1 shows possible probability density distributions of a received signal for the different possible signal values. It is not known to the receiver at the UE, which of the three possible distributions the received signal has. Therefore, the receiver has three hypotheses from which it has to decide one. The received signal is a sum of a discretely distributed desired signal d and a continuously distributed unwanted signal u with an unknown distribution. The areas under the central distribution of the unwanted signal, which are above the thresholds $th_-$ and $th_+$ (and thus indicated probabilities of respective detection errors) should stay all the times close to a desired constant value (e.g. 5%), so that constant detection quality can be ensured at changing conditions.

According to the embodiments, a robust and reliable way of estimating the interference variance Var[u] (i.e. the variance of the unwanted signal u) is provided by using a signal with a known power level and/or characteristic of another channel, such as for example the CPICH.

In an embodiment, the estimation of the interference can be performed separately for each RAKE-finger of a RAKE receiver provided at the UE. A RAKE receiver is a radio receiver designed to counter the effects of multipath fading. It does this by using several "sub-receivers" or receiving paths (RAKE fingers) each delayed slightly in order to tune in to the individual multipath components. Each component is decoded independently, but at a later stage combined in order to make the most use of the different transmission characteristics of each transmission path.

In the embodiment, the noise variance of the interference is not estimated for each RAKE finger. Instead, the per-finger interference estimates are complex-values, i.e. true interference samples. These samples are RAKE-combined to achieve the final interference sample. Then, after RAKE-combining that the variance is estimated. For example, if the traditional RAKE-combining is used, the final variance estimate will be:

$$\text{Var}[u(i)] = \text{Var}\left[\sum_{l=0}^{L-1} h_l^*(i) f_l^u(i)\right] \quad (3)$$

where $h_l^*(i)$ is the complex conjugate of the channel estimate of the l'th multipath at symbol time index i, and $f_l^u(i)$ is the complex unwanted signal estimate of the finger corresponding to multipath l.

However, it is noted that other combination methods can be used as well in the RAKE-receiver. Such other combination methods include e.g. true maximal-ratio combining (MRC) which is a method of diversity combining in which the signals from each channel are added together, the gain of each channel is made proportional to the signal level and inversely proportional to the mean square noise level in that channel, and then the same proportionality constant is used for all channels. MRC is also known as ratio-squared combining, predetection combining and selective combining.

Another possible combination method is interference rejection combining (IRC). IRC is another term for optimum combining which requires that an optimum complex weight has to be found for each receiving path. These weights form a weight vector w, which can be optimised using different algorithms and criteria. For example, minimum mean squared error (MMSE), maximum signal-to-interference-plus-noise ratio (SINR), maximum likelihood (ML) and minimum noise variance (MNV) criteria can be applied. All the criteria lead to similar weight vector, which is proportional to the signal strengths of the desired and undesired signals and their co-variances.

The combination method itself is not relevant. In an embodiment, the power (=variance) of the finger-wise unwanted signal estimates $f_l^u(i)$ (interference estimates) can be estimated after combining. The estimates $f_l^u(i)$ can be obtained from the difference between a symbol or signal of a known reference channel, e.g., an instantaneous received CPICH symbol (e.g., symbol i), and the moving average of many symbols of the reference channel, e.g. CPICH symbols (say, from symbol i−u to symbol i+v). This can be achieved as follows. One CPICH finger output (for multipath l) can be modeled as:

$$f_l(i) = f_l^d(i) + f_l^u(i) \quad (4)$$

where $f_l^d(i)$ is the desired signal part and $f_l^u(i)$ is the unwanted signal part, or interference. Because of the changing channel, the moving average of $f_l$ will be the estimate of the desired signal part $f_l^d$. It can be determined by taking a moving mean of the CPICH finger outputs:

$$f_l^d(i) = \hat{E}[f_l(i)] = \frac{1}{u+v+1}\left[\sum_{i'=i-u}^{i+v} f_l(i')\right] \quad (5)$$

where u symbols are taken to the average from the history, and v symbols from the future. The 'hat' over E denotes that is an estimate, not the true mean.

Now $f_l^d(i)$ is available as well as $f_l(i)$. The undesired part, or the instantaneous interference sample is computed as the difference:

$$f_l^u(i) = f_l(i) - f_l^d(i) \quad (6)$$

Figure 2:
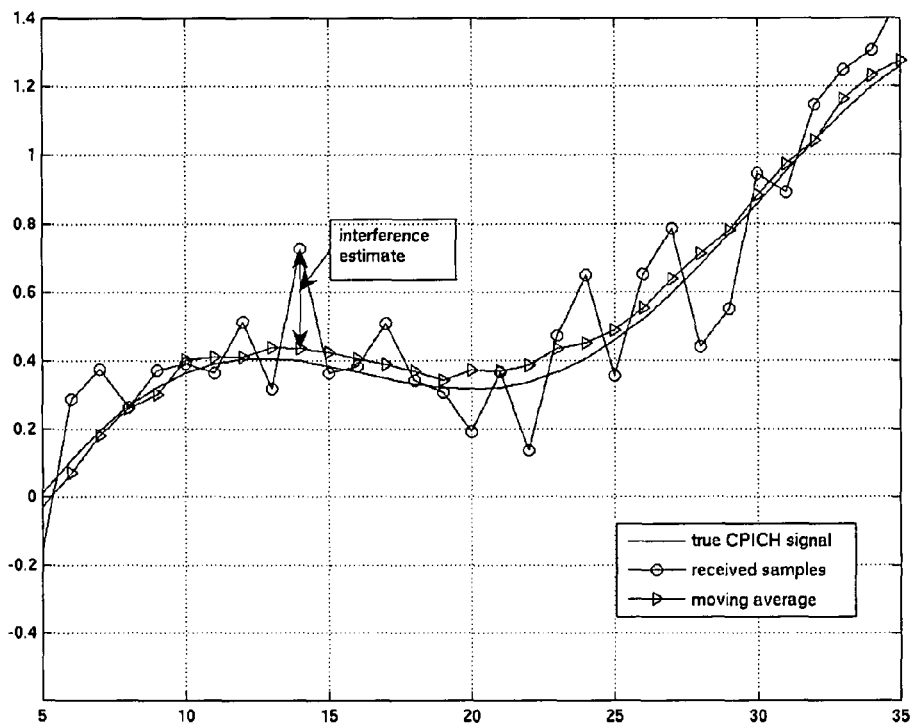
FIG. 2 shows an exemplary time chart indicating measured samples of a pilot channel, a moving average thereof, and corresponding true samples.

FIG. 2 shows an exemplary time chart indicating measured samples of the CPICH, a moving average thereof, and corresponding true samples. The interference estimate is indicated as the difference between the moving average and the instantaneous interference estimate. The true smoother line of true sample indicates the change of the true samples transmitted from by the transmitter provided e.g. at the base station.

In another embodiment, the moving average of the CPICH symbols (or symbols of another reference channel) $f_l^d(i)$ can also be used as the channel estimate $h_l(i)$, i.e. $f_l^d(i) = h_l(i)$. Thus, equation (6) can be written as:

$$f_l^u(i) = f_l(i) - h_l(i) \quad (7)$$

The variance of the Rake-combined E-HICH/E-RGCH interference (equation (3)) can be thus written in terms of CPICH symbols and channel estimates:

$$\text{Var}[u(i)] = \text{Var}\left[\sum_{l=0}^{L-1} h_l^*(i) f_l^u(i)\right] \quad (8)$$
$$= \text{Var}\left[\sum_{l=0}^{L-1} h_l^*(i)(f_l(i) - h_l(i))\right]$$

Figure 3:
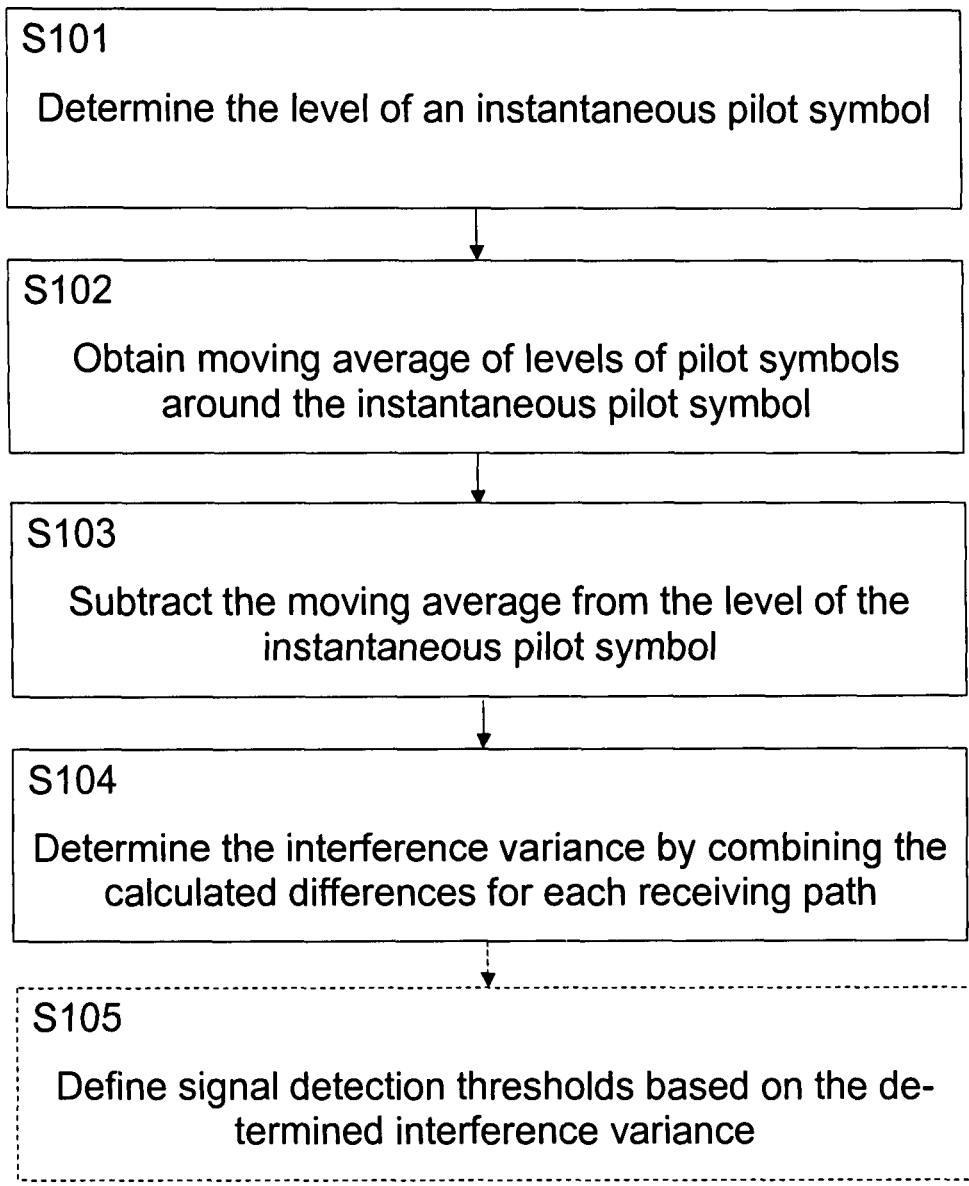
FIG. 3 shows a flow diagram of a noise variance estimation procedure according to an embodiment.

FIG. 3 shows a more general flow diagram of a noise variance estimation procedure according to another embodiment.

In an initial step S101, the level of an instantaneous pilot symbol or any other kind of symbol received via a reference channel or other known channel is determined. Then, in step S102, a moving average of levels of the pilot symbols around the instantaneous pilot symbol is obtained. The range or time period from which the symbols for the moving average are derived can be of any suitable size and location, depending on the individual needs of the concerned application. Then, an interference estimate is obtained by subtracting the moving average from the level of the instantaneous pilot symbol (step S103). The desired interference variance can then be determined or estimated in step S104 by combining the calculated differences for each receiving path (e.g. RAKE finger in case of a RAKE receiver).

In an optional further step S105 which is based on the individual implementation, the obtained interference variance could then be used to define or calculate detection thresholds for deciding on signal values of a signal of unknown level or power, received via another channel.

Figure 4:
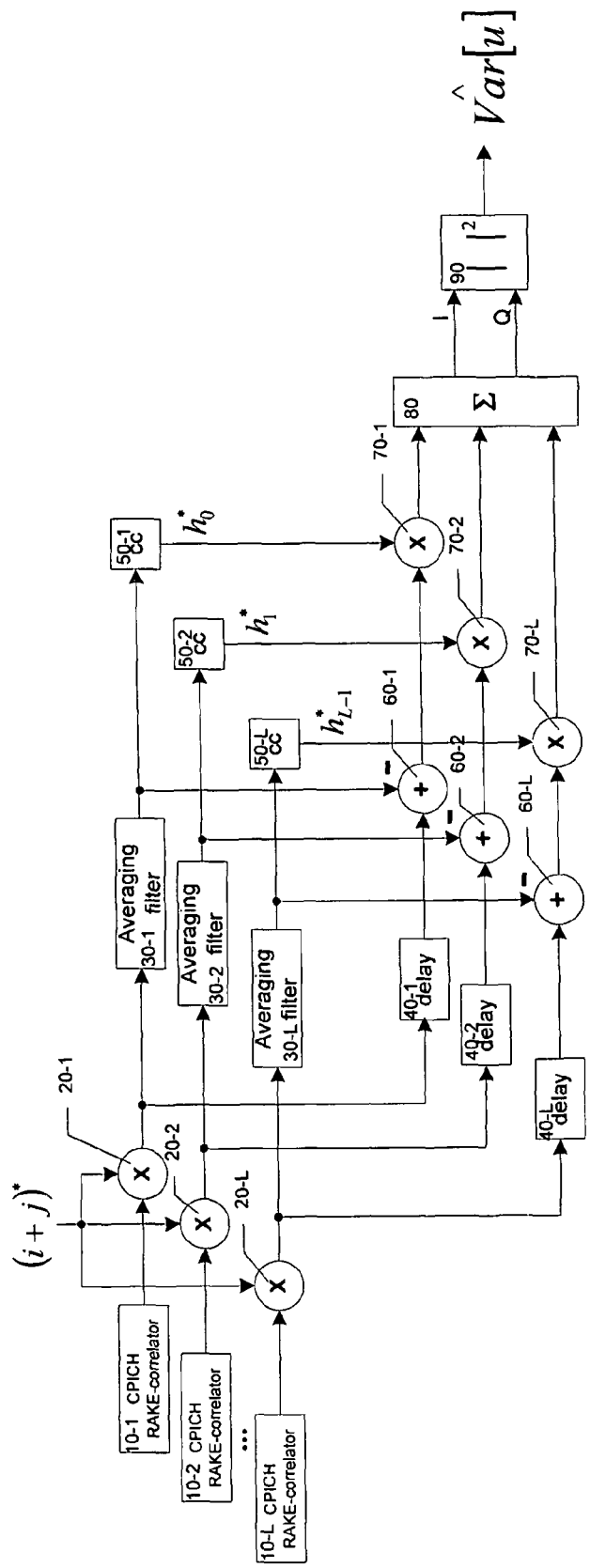
FIG. 4 shows a schematic block diagram of a variance estimation apparatus according to an embodiment.

FIG. 4 shows a schematic block diagram of a variance estimation apparatus according to a further embodiment which is based on the CPICH as reference channel and which can be implemented in receiver or detector modules or chips based on an application specific integrated circuit (ASIC), an application specific integrated processor (ASIP), a digital signal processor (DSP), or any other digital signal processing implementation architecture.

According to FIG. 4, CPICH RAKE correlators 10-1 to 10-L are provided for each of L RAKE fingers (or receiving paths) to determine pilot symbols which are converted and/or descrambled by respective multiplier circuits 20-1 to 20-L. The obtained complex-valued pilot symbols are then supplied to respective averaging filters 30-1 to 30-L which are configured to generate moving average values over a predetermined number of symbols (or symbol period). In parallel, the complex-valued pilot symbols are also supplied to delay circuits or elements 40-1 to 40-L for introducing a delay to compensate for the averaging procedure of the averaging filters 30-1 to 30-L, so that the outputs of the averaging filters 30-1 to 30-L can be subtracted by respective subtractor circuits 60-1 to 60-L in time-synchronized manner. Additionally, the outputs of the averaging filters 30-1 to 30-L are supplied to processing circuits 50-1 to 50-L which generate the complex conjugates thereof (e.g. by inverting the imaginary parts of the complex values). These complex conjugates are multiplied as channel estimates with the respective outputs (i.e. interference estimates) of the subtractors 60-1 to 60-L and supplied to an adding circuit 80 to obtain combined in-phase (I) and quadrature phase (Q) components of the combined values. A finals processing circuit 90 receives the I and Q components and generates an absolute value (e.g. by obtaining the square root of the sum of squares of I and Q), which corresponds to the desired estimated noise variance.

Figure 5:
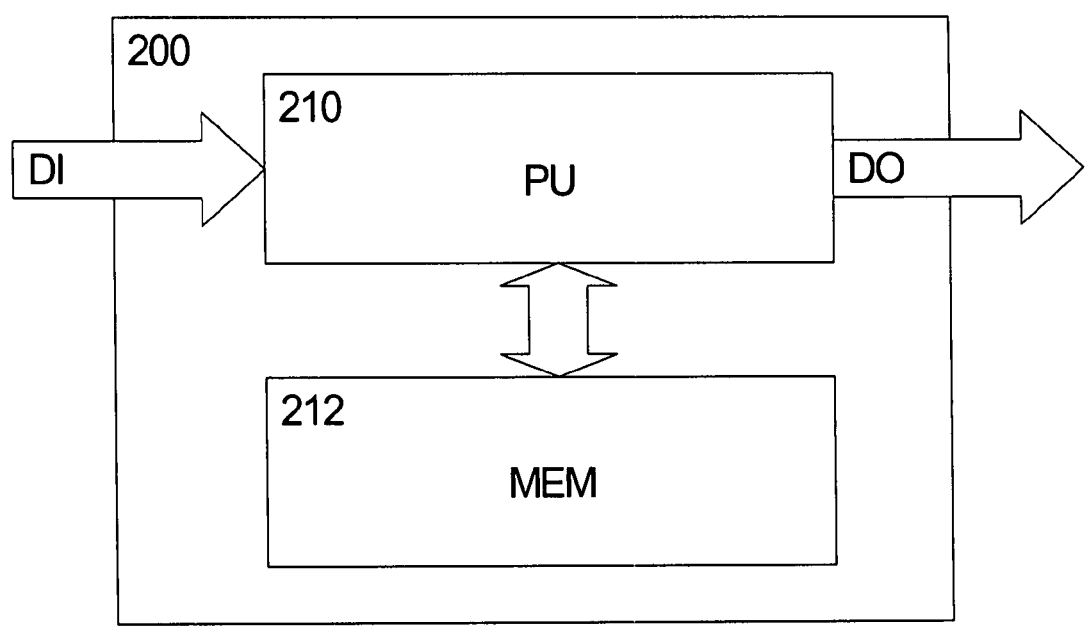
FIG. 5 shows a schematic block diagram of a software-based implementation according to an embodiment.

FIG. 5 shows a schematic block diagram of an alternative software-based embodiment of the proposed functionalities for achieving noise variance estimation. The required functionalities can be implemented in a receiver, estimation, or detection module 200 with a processing unit 210, which may be any processor or computer device with a control unit which performs control based on software routines of a control program stored in a memory 212. Program code instructions are fetched from the memory 212 and are loaded to the control unit of the processing unit 210 in order to perform the processing steps of the above functionalities described the flow diagram of FIG. 3. These processing steps may be performed on the basis of input data DI and may generate output data DO, wherein the input data DI may correspond to the samples or symbols obtained via the reference channel (e.g. pilot channel), and the output data DO may correspond to the estimated noise variance or the signal values detected by using the noise variance.

In summary, a method, apparatus, and computer program product have been described, wherein a level of a first signal received via first channel is determined. Additionally, a moving average of a plurality of determined levels of the first signal is obtained, and the moving average is subtracted from the determined level. The subtraction result is then used for estimating a noise variance of a second signal received via a second channel.

The present invention is not restricted to the above predetermined embodiment with its specific network elements and signaling messages. For example, the present invention may be applied to any communication system which provides a first signal via a first channel capable of being detected and a second signal with unknown power or signal level. The preferred embodiment may thus vary within the scope of the attached claims.

The invention claimed is:

1. A method, comprising:
    determining a level of a first signal received via a first channel;
    obtaining a moving average of a plurality of determined levels of said first signal;
    subtracting said moving average from said determined level and outputting a subtraction result indicative thereof;
    using the subtraction result to estimate a noise variance of a second signal received via a second channel; and
    performing said subtracting and said outputting for each path of a plurality of receiving paths, wherein said noise variance is estimated by combining subtraction results of said plurality of receiving paths.

2. The method according to claim 1, wherein said plurality of receiving paths are RAKE fingers.

3. The method according to claim 1, wherein said combining is a RAKE combining, a maximal-ratio combining, or an interference rejection combining.

4. The method according to claim 1, wherein said moving average is used as a channel estimate.

5. The method according to claim 1, wherein said first channel is a pilot channel, and said second channel is a downlink physical channel of a wireless transmission system.

6. The method according to claim 5, wherein said second channel is a hybrid automatic repeat request indicator channel or a relative grant channel of a high speed uplink packet access.

7. The method according to claim 1, further comprising:
    calculating a threshold for detection of a value of a signal received via said second channel based on a standard deviation derived from said noise variance.

8. An apparatus, comprising:
    a level determiner configured to determine a level of a first signal received via a first channel;
    an averaging stage configured to obtain a moving average of a plurality of determined levels of said first signal;
    a subtraction stage configured to subtract said moving average from said determined level and configured to output a subtraction result indicative thereof; and
    an estimator configured to use the subtraction result to estimate a noise variance of a second signal received via a second channel,
    wherein said averaging stage comprises a plurality of averaging circuits for each of a plurality of receiving paths, said subtraction stage comprises a plurality of subtraction circuits for each of said plurality of receiving paths, and wherein said estimator is configured to estimate said noise variance by combining subtraction results of said plurality of receiving paths.

9. The apparatus according to claim 8, wherein said averaging stage comprises an averaging filter.

10. The apparatus according to claim 8, further comprising:
    a delay stage configured to delay said determined level and supplying the delayed determined level to said subtraction stage.

11. The apparatus according to claim 8, wherein said plurality of receiving paths are RAKE fingers of a RAKE receiver.

12. An apparatus comprising:
    level determination means for determining a level of a first signal received via first channel;
    averaging means for obtaining a moving average of a plurality of determined levels of said first signal;
    subtraction means for subtracting said moving average from said determined level and outputting a subtraction result indicative thereof; and
    estimation means for using the subtraction result to estimate a noise variance of a second signal received via a second channel,
    wherein said averaging means comprises a plurality of averaging means for each of a plurality of receiving paths, said subtraction means comprises a plurality of subtraction means for each of said plurality of receiving paths, and wherein said estimation means estimates said noise variance by combining subtraction results of said plurality of receiving paths.

13. A terminal device, comprising:
    a level determiner configured to determine a level of a first signal received via a first channel;
    an averaging stage configured to obtain a moving average of a plurality of determined levels of said first signal;

a subtraction stage configured to subtract said moving average from said determined level and configured to output a subtraction result indicative thereof;

an estimator configured to use the subtraction result to estimate a noise variance of a second signal received via a second channel; and a detection unit configured to detect a value of a signal received via said second channel based on a standard deviation derived from said noise variance, wherein said averaging stage comprises a plurality of averaging circuits for each of a plurality of receiving paths, said subtraction stage comprises a plurality of subtraction circuits for each of said plurality of receiving paths, and wherein said estimator is configured to estimate said noise variance by combining subtraction results of said plurality of receiving paths.

14. A receiver module, comprising:

a level determiner configured to determine a level of a first signal received via a first channel;

an averaging stage configured to obtain a moving average of a plurality of determined levels of said first signal;

a subtraction stage configured to subtract said moving average from said determined level and configured to output a subtraction result indicative thereof; and an estimator configured to use the subtraction result to estimate a noise variance of a second signal received via a second channel, wherein said averaging stage comprises a plurality of averaging circuits for each of a plurality of receiving paths, said subtraction stage comprises a plurality of subtraction circuits for each of said plurality of receiving paths, and wherein said estimator is configured to estimate said noise variance by combining subtraction results of said plurality of receiving paths.

15. A chip device, comprising:

a level determiner configured to determine a level of a first signal received via a first channel;

an averaging stage configured to obtain a moving average of a plurality of determined levels of said first signal;

a subtraction stage configured to subtract said moving average from said determined level and configured to output a subtraction result indicative thereof; and an estimator configured to use the subtraction result to estimate a noise variance of a second signal received via a second channel, wherein said averaging stage comprises a plurality of averaging circuits for each of a plurality of receiving paths, said subtraction stage comprises a plurality of subtraction circuits for each of said plurality of receiving paths, and wherein said estimator is configured to estimate said noise variance by combining subtraction results of said plurality of receiving paths.

16. A computer program embodied on a computer readable medium, the computer program being configured to control a processor to perform:

determining a level of a first signal received via a first channel;

obtaining a moving average of a plurality of determined levels of said first signal;

subtracting said moving average from said determined level and outputting a subtraction result indicative thereof;

using the subtraction result to estimate a noise variance of a second signal received via a second channel; and performing said subtracting and said outputting for each path of a plurality of receiving paths, wherein said noise variance is estimated by combining subtraction results of said plurality of receiving paths.

* * * * *